United States Patent [19]

Schmidt et al.

[11] 4,039,197
[45] Aug. 2, 1977

[54] SEALING RING

[75] Inventors: Herbert Schmidt, Frankfurt-Unterliederbach; Rolf Weiler, Frankfurt-Sindlingen, both of Germany

[73] Assignee: ITT Industries, Inc., New York, N.Y.

[21] Appl. No.: 609,200

[22] Filed: Sept. 2, 1975

[30] Foreign Application Priority Data

Sept. 4, 1974 Germany .................... 2442338

[51] Int. Cl.² .................................... F16J 15/32
[52] U.S. Cl. ........................ 277/24; 277/48; 277/173; 277/188 R; 277/206 R
[58] Field of Search .............. 277/24, 188 R, 206, 277/178, 173, 48, 35, 53, 140, 198, 154

[56] References Cited

U.S. PATENT DOCUMENTS

| | | | |
|---|---|---|---|
| 2,293,479 | 8/1942 | Thorndike | 277/35 |
| 2,487,669 | 11/1949 | Pattulo et al. | 277/173 |
| 2,960,355 | 11/1960 | Bayerl | 277/173 |
| 2,966,376 | 12/1960 | Reynolds | 277/24 |
| 3,368,819 | 2/1968 | Otto | 277/48 |
| 3,912,284 | 10/1975 | Gosling et al. | 277/53 |

FOREIGN PATENT DOCUMENTS 2,154,228  3/1973  Germany

*Primary Examiner*—Richard E. Aegerter
*Assistant Examiner*—L. Footland
*Attorney, Agent, or Firm*—James B. Raden; William J. Michals

[57] ABSTRACT

A sealing ring is disclosed for sealing a pin which is displaceable chiefly along its axis through a passage in a housing wall into a chamber. A sealing ring housing is inserted into an annular groove in the housing wall. The sealing ring housing encompasses a ring made of wear-resistance material seated on the pin with a small radial clearance and having a large radial clearance in the sealing ring housing. A slide ring is seated on the pin without clearance with a large radial clearance in the sealing ring housing. The invention provides a sealing ring which permits easy axial and radial movement of the pin and prevents the ingress of dirt and humidity into the interior of the housing from the outside through the pin passage.

3 Claims, 2 Drawing Figures

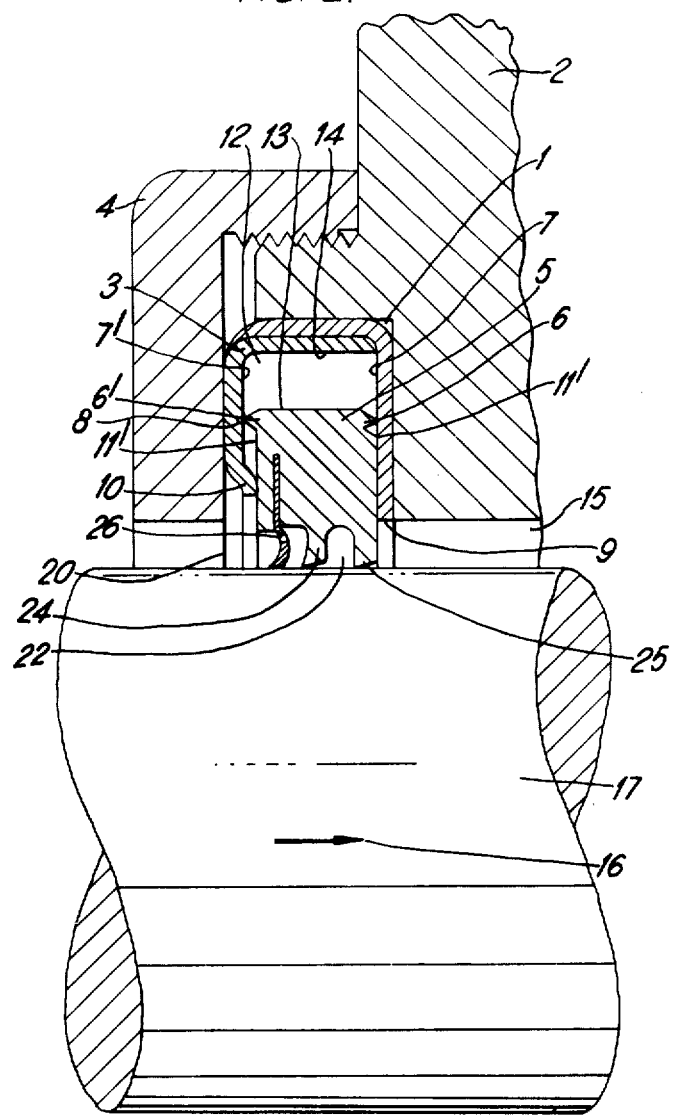

SEALING RING

BACKGROUND OF THE INVENTION

1. Field of the Invention

This invention relates to a sealing ring for sealing a pin which is axially displaceable mainly in one direction and extends through a passage in a housing wall into a chamber internal to a housing. The pin has a large radial clearance for motion in the passage. A sealing ring housing is inserted into an annular groove in the housing wall to support a ring made from wear-resistant material which is seated on the pin with small radial clearance and with radial clearance of motion in the sealing ring housing, and with a slide ring seated on the pin without clearance and having large radial clearance of motion in the sealing ring housing.

2. Description of the Prior Art

From the German unexamined patent application DT-OS No. 2,154,228, a sealing ring is known for sealing a pin extending through a housing wall, said ring having an annular housing screwed into an annular threaded groove in the housing wall. Radially supporting itself against the circumferential inner face of the annular sealing ring is an outer circumferential face of a ring which is made from elastic material and is biassed against the pin against which it rests with its radial inner face. In order to improve the gliding ability, a slide ring is disposed between the elastic ring and the pin, said slide ring consisting of a plastic material having good antifriction properties. On both sides of the elastic ring, there are disposed supporting rings made from nondeformable material. Said supporting rings, which have large radial clearance of motion in the seal housing, are seated on the pin with but little clearance in order to prevent the elastic ring from being deformed in an axial direction or from being drawn into the slot between the supporting ring and the pin.

The disadvantage of said sealing ring is that particles of dirt and humidity may penetrate with the pin into the interior of the housing from the outside. Further, higher forces have to be applied for displacing the pin because the elastic ring rests against the pin with bias. Moreover, it is a disadvantage that for a radial movement of the pin the elastic ring needs to be deformed which equally requires higher forces.

SUMMARY OF THE INVENTION

It is therefore an object of the invention to provide a sealing ring of the above-mentioned type which permits an easy axial and radial movement of the pin and prevents the ingress of dirt and humidity from the outside through the pin passage into the interior of the housing.

This object is achieved according to the invention in that the slide ring consists of a material having a low coefficient of friction, in that its lateral faces sealingly rest against the lateral inner faces of the sealing ring housing, and in that it has a grease-filled annular chamber which is open towards the pin.

The lateral faces of the slide ring advantageously include circumferential sealing edges which rest slightly biassed against the lateral inner faces of the sealing ring housing.

A simple and inexpensive method for manufacture of the sealing ring consists in the case of a slide ring designed as a member having, when considered in axial direction of movement, an outer lip resting against the pin, a ring made from wear-resistant material which is inserted into the slide ring, a grease-filled annular chamber open towards the pin, and a second inner sealing lip which rests against the pin. It is an advantage herein if the outer lip has an axially outwardly projecting extension resting against the pin. With an outer lip, when the pin is displaced into the housing, the major part of the dirt and moisture present will be scraped off by the projecting extension of the outer lip. Dirt which sticks to the pin so that it can not be scraped off by the said extension will be scraped off by the ring made from wear-resistant material, preferably from rustproof metal. If small particles of dirt and a film of moisture are still left, the grease in the annular chamber will prevent their ingress into the housing so that only a minimal grease film will remain on the cleaned pin after the pin has moved past the inner sealing lip.

In another embodiment of the inventive sealing ring, the slide ring is a member having, considered in axial direction of movement, a ring inserted into the slide ring and made from wear-resistant material, preferably from rustproof metal, and two sealing lips resting against the pin, said lips defining a grease-filled annular chamber which is open towards the pin.

In this embodiment, the ring made from wear-resistant material will scrape off all dirt deposits on the pin so that the sealing lip which follows has to take away only minute particles of dirt and humidity, with the grease in the adjacent annular chamber thereby preventing the ingress of the last remaining particles of dirt and moisture into the housing.

The radial clearance of pin movement in the sealing ring is achieved by providing a chamber between the radially outer face of the slide ring and the radially inner face of the sealing-ring housing, which chamber corresponds to the radial pin clearance in the sealing ring. This chamber is advantageously filled with grease, thereby making it impossible for dirt and humidity to penetrate into the interior of the housing through said chamber.

In a further advantageous embodiment of the invention, one or both lateral faces of the sealing-ring housing include a circumferential indentation which rests slightly biassed against the lateral face of the slide ring.

DESCRIPTION OF THE DRAWINGS

One embodiment of the invention is described in more detail in the following, with reference to the accompanying drawings, in which:

FIG. 2 is a cross-sectional view of a second embodiment of a sealing ring constructed in accordance with the invention.

DESCRIPTION OF PREFERRED EMBODIMENTS

Figure 1:
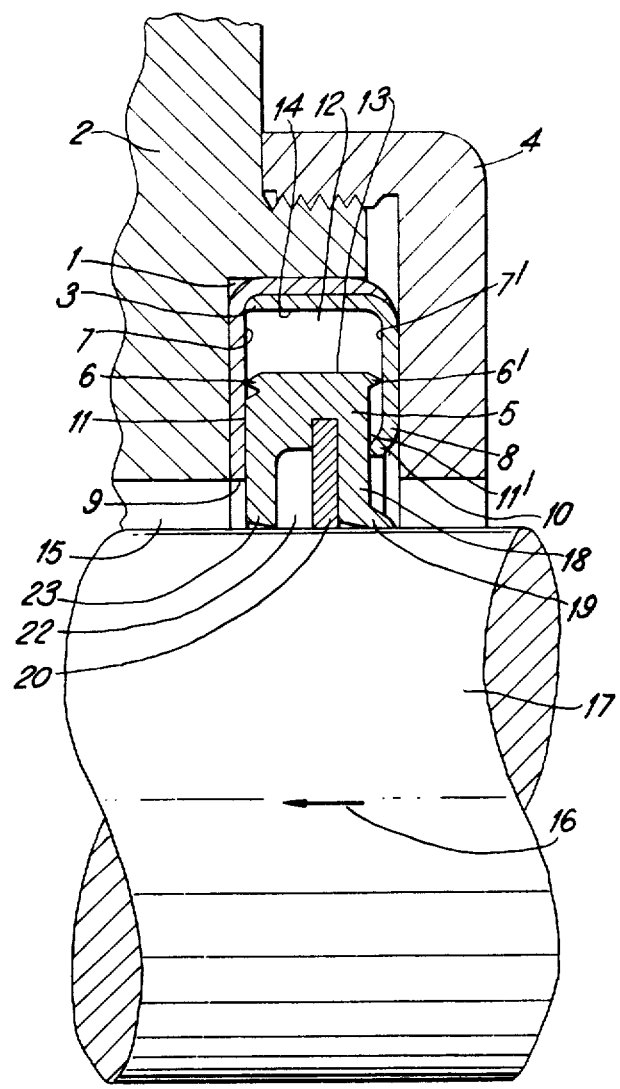
FIG. 1 is a cross-sectional view of a first embodiment of a sealing ring constructed in accordance with the invention.

Referring now to FIG. 1, a sealing-ring housing 3 consisting of two interlocking members is inserted into a groove 1 of a housing 2 and retained in said groove 1 by cover 4 which is screw-mounted on the housing 2. A slide ring 5 made from material having a low coefficient of friction, for instance teflon, the outer diameter of which is substantially smaller than the inner diameter of the sealing-ring housing 3, has large radial clearance of motion in said sealing-ring housing 3. At each of its lateral faces 11, 11', the slide ring 5 has a circumferential sealing edge 6,6' resting slightly biased against the lateral inner faces 7, 7' of the sealing-ring housing 3. At the lateral outer face 8 of the sealing-ring housing 3, the edge of the passage bore is provided with a circumferential indentation 10 which equally rests slightly biassed against the slide ring 5 lateral face 11 which corresponds to said lateral face 8. The chamber 12 between the radial outer face 13 of the slide ring 5 and the radial inner face 14 of the sealing-ring housing 3 is filled with grease, thereby making it impossible for dirt and humidity to penetrate from the outside into the chamber 15 internal to the housing through said chamber 12.

The slide ring 5 is designed as a member which, considered in the substantially prevailing direction 16 of movement of the pin 17, consists of a lip 18 having an outwardly projecting annular extension 19 which rests against the pin 17 without any clearance. A ring 20 which is made from wear-resistant material, preferably from rustproof steel, is inserted into the slide ring 5 and rests against the lip 18, thereby serving as both a supporting and scraper ring. Adjacent the ring 20 is a grease-filled annular chamber 22 open towards the pin 17 and limited in the direction of the chamber 15 internal to the housing by a second inner sealing lip 23 which rests against the pin 17. When the pin 17 is displaced towards the chamber 15 internal to the housing, dirt and humidity that are deposited on the pin 17 will first be scraped off by the extension 19 of the lip 18. More dirt that still sticks to the pin 17 will then be scraped off by the ring 20 so that the remaining small particles of dirt and a humidity film, if any, will be absorbed by the grease in the annular chamber 22. Following a last scraping at the sealing lip 23, a perfectly clean pin 17 will enter the housing chamber 15. At the same time, ease of movement of the pin 17 in both radial and axial direction will be insured.

The sealing ring illustrated in FIG. 2 has the same structure as the sealing ring of FIG. 1, the only difference being the arrangement of the members resting against the pin 17.

Thus, considered in the substantially prevailing direction 16 of pin 17 movement, there is first arranged the ring 20 which is inserted into the slide ring 5 and made from wear-resistant material. At a small distance therefrom, there follow two sealing lips 24 and 25 of the slide ring 5 which rest against the pin 17. The annular chamber 22 defined by the two sealing lips 24 and 25 and open towards the pin 17 is filled with grease.

When the pin 17 is displaced towards the chamber 15 internal to the housing, the ring 20 will scrape off the dirt deposits on the pin 17. The sealing lip 24 which follows will then remove small particles of dirt and humidity. The grease contained in the annular chamber 22 will prevent the last remainders of minute particles of dirt and humidity from penetrating into the chamber 15 internal to the housing so that after a last scraping of the sealing lip 25 against the pin 17, a perfectly clean pin 17 will enter the chamber 15 internal to the housing.

To permit the dirt scraped off at the sealing lip 24 to reach the outside, openings 26 are provided in the ring 20.

While the principles of the invention have been described above in connection with specific apparatus and applications, it is to be understood that this description is made only by way of example and not as a limitation on the scope of the invention.

We claim:

1. A sealing ring assembly for sealing a shaft, comprising:

a radially and axially displaceable shaft within a shaft housing having a passage bore therein for receiving said shaft therein and having an annular recessed bore on one end thereof which is concentric with said passage bore;

a sealing-ring housing mounted within said recessed bore, said sealing-ring housing having first and second axially spaced and radially extending annular flanges the inside diameters of which are substantially equal to the diameter of said passage bore;

a slide ring concentrically mounted about said shaft for movement therewith and between said flanges, the inside diameter of said slide ring being substantially equal to the outside diameter of said shaft to provide and essentially zero clearance seal therebetween and wherein the outside diameter of said slide ring is substantially less than the inside diameter of said recessed bore to accomodate said radial displacement of said shaft within said shaft housing; said slide ring comprising a substantially rigid material having a low coefficient of friction and said sliding ring terminating at its radially inner edge in two axially spaced legs which form a closed chamber therebetween and which opens towards said shaft for receiving a sealing compound therein;

a scraper ring fixedly mounted to said slide ring and concentrically mounted about said shaft in essentially zero clearance sliding relationship therewith, said scraper ring being mounted immediately adjacent at least one of said legs and cooperating therewith to scrape said shaft upon axial displacement of said shaft, thereby to remove extraneous materials present on said shaft.

2. The assembly according to claim 1 wherein said scraper ring is mounted to said slide ring between said legs of said slide ring.

3. The assembly according to claim 1 wherein said scraper ring is mounted to said slide ring externally of said closed chamber and therefore immediately adjacent only one of said legs of said slide ring.

* * * * *